United States Patent [19]

Buchanan

[11] Patent Number: 5,767,382
[45] Date of Patent: Jun. 16, 1998

[54] METHOD AND APPARATUS FOR TESTING SHOCK ABSORBERS AND/OR SUSPENSION SYSTEM IN MOTOR VEHICLES

[75] Inventor: Nigel Buchanan, Fife, Great Britain

[73] Assignee: Liquid Levers Limited, Scotland

[21] Appl. No.: 81,397

[22] Filed: Jun. 22, 1993

Related U.S. Application Data

[63] Continuation of Ser. No. 634,112, Feb. 25, 1991, abandoned.

[30] Foreign Application Priority Data

Jun. 25, 1988 [GB] United Kingdom ............ 8815167

[51] Int. Cl.$^6$ .................................................. G01M 17/04
[52] U.S. Cl. ................................... 73/11.08; 73/11.07
[58] Field of Search ...................... 73/11.04, 11.07, 73/11.08, 11.09

[56] References Cited

U.S. PATENT DOCUMENTS

| | | | |
|---|---|---|---|
| 3,792,604 | 2/1974 | Fader et al. | 73/11.07 |
| 3,857,276 | 12/1974 | Fader et al. | 73/11.07 |
| 3,906,779 | 9/1975 | Graham et al. | 73/11.07 |
| 4,107,975 | 8/1978 | Cargile | 73/11.07 |
| 4,111,033 | 9/1978 | Bollinger | 73/11.07 |
| 4,376,387 | 3/1983 | Stevens et al. | 73/11.07 |
| 4,761,991 | 8/1988 | Fembock | 73/11.07 |

*Primary Examiner*—Richard Chilcot
*Assistant Examiner*—Elizabeth L. Dougherty
*Attorney, Agent, or Firm*—Lalos & Keegan

[57] ABSTRACT

The invention relates to a method and apparatus for testing a shock absorber and/or suspension system while in situ in a motor vehicle. The method comprising first raising a wheel and the bodywork or chassis of a motor vehicle under test from a ground engaging position to a raised position by means of a lifting device in supportive engagement with the wheel, and moving the lifting device away from the wheel to allow the wheel to return to the ground engaging position under free fall whereby relative vertical motion occurs between the wheel and the bodywork during the fall. Characteristics of the relative motion of the vehicle as a consequence of the fall are assessed and compared to a corresponding characteristic obtained for the motor vehicle having new or as new shock absorbers and suspension system whereupon the condition of the shock absorber and/or suspension system of the tested vehicle is established.

10 Claims, 5 Drawing Sheets

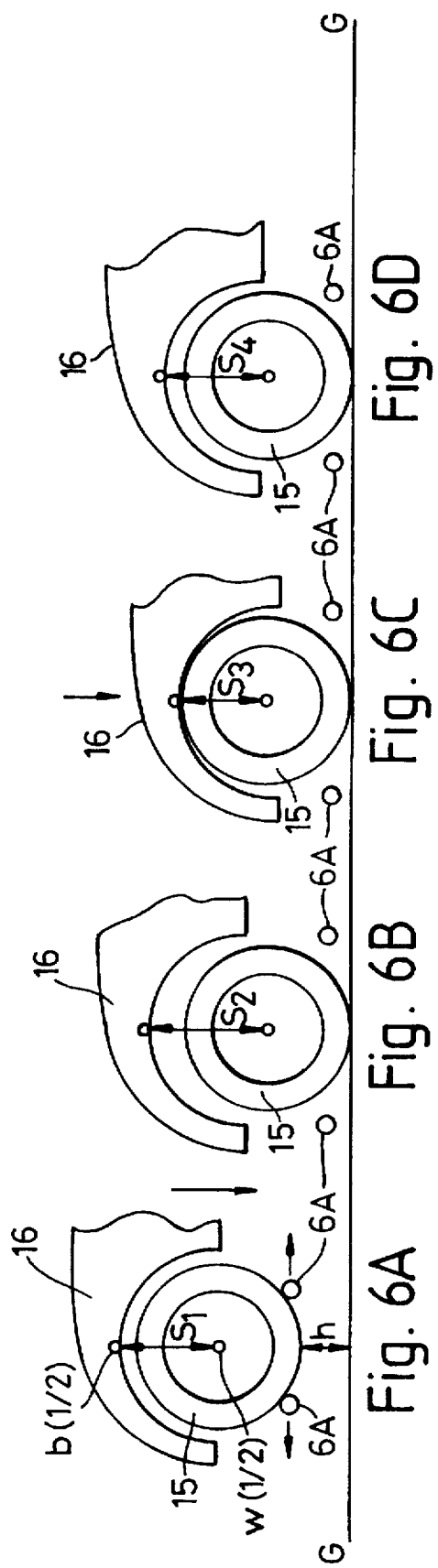
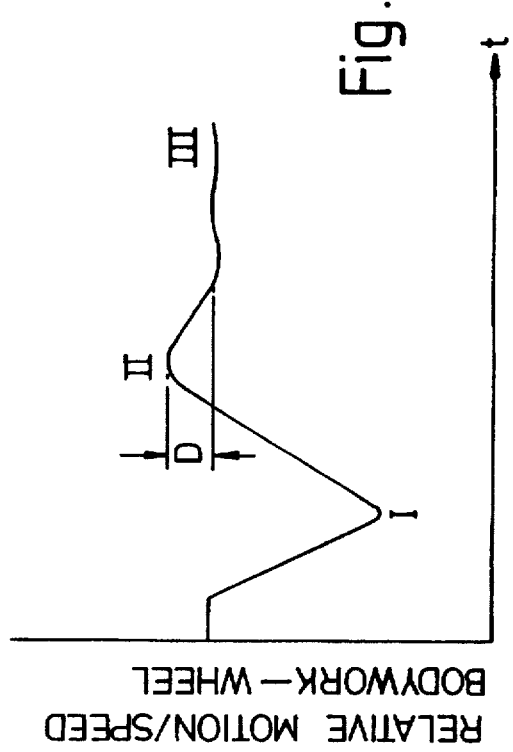

METHOD AND APPARATUS FOR TESTING SHOCK ABSORBERS AND/OR SUSPENSION SYSTEM IN MOTOR VEHICLES

This is a continuation of application Ser. No. 07/634,112 filed on Feb. 25, 1991 abandoned.

DESCRIPTION

The present invention relates to a method and apparatus for testing shock absorbers and/or suspension systems in motor vehicles, especially in motor cars and light commercial vehicles.

For safety reasons, it is necessary for the suspension systems of motor vehicles to be in acceptable order, and this applies particularly to the condition of the shock absorbers or dampers in the suspension system. Shock absorbers fitted to motor cars and light-vans usually have a life expectancy of around 35 000 miles (56 000 KM). At present, without removing the shock absorber from the vehicle and testing it on a special testing machine it can be difficult to assess the condition of the shock absorber. Of course, if the item is leaking or has an obvious mechanical defect then the need for replacement will be very apparent, but otherwise the assessment of the shock absorbers' condition can be a rather arbitrary affair.

It is the principal object of the present invention to enable the condition of motor vehicle shock absorbers to be accurately assessed without the need for removal of the shock absorbers from the vehicle.

According to one aspect of the present invention a method of testing a shock absorber and/or suspension system while in situ in a motor vehicle, characterised in that the method comprises raising a wheel and the bodywork or chassis of a motor vehicle under test from a ground engaging position to a raised position by means of a lifting device in supportive engagement with said wheel, moving the lifting devices away from the wheel to allow the wheel to return to the ground engaging position whereby relative vertical motion occurs between the wheel and the bodywork, electronically assessing the speed differential or other parameter of the relative motion, noting the assessed characteristic, and comparing the assessed characteristic with the corresponding characteristic obtained for the motor vehicle having new or as new shock absorbers and suspension system whereby the condition of the shock absorber and/or suspension system of the tested vehicle is established.

The assessment is preferably done utilising computer apparatus enabling the assessed characteristic to be displayed on a monitor screen and/or set out on a computer print out, the computer apparatus preferably including memory storage means for the corresponding characteristics of a range of vehicles having new or as new shock absorbers and suspension systems to facilitate comparison with the assessed characteristic.

Preferably the relative motion is assessed by an electronic scanning operation of an indicator element on the wheel and an associated indicator element on the bodywork.

According to another aspect of the present invention apparatus for use in testing a shock absorber and/or suspension system of a motor vehicle comprises means for causing relative vertical motion between a wheel and a bodywork or chassis of a motor vehicle, said relative motion creating means comprising lifting means engaging said wheel for raising the wheel together with the bodywork by a predetermined amount from a ground engaging position, said lifting means being movable away from the wheel for release of the wheel at the raised position, electronic sensing means for sensing as a sensed characteristic, the speed differential or other parameter of said relative motion including means for noting the sensed characteristic, and comparison means for comparing said sensed characteristic with a corresponding characteristic obtained for the motor vehicle when it has new or as new shock absorbers and suspension system whereby the condition of the shock absorber and/or suspension system of the tested vehicle is established.

Preferably the electronic sensing means comprises an electronic scanner, such as a laser scanner, scanning indicator elements mounted on the wheel and the vehicle bodywork respectively, sensed indications from these elements preferably being fed to computer apparatus for the provision of said sensed characteristic. The computer apparatus preferably includes a monitor screen and/or a print out for display of the sensed characteristic.

Preferably further, the computer apparatus includes memory storage means for the corresponding characteristics of a suitable range of motor vehicles having new or as new shock absorbers and suspension system to facilitate comparison with the sensed characteristic.

An embodiment of the present invention will now be described by way of example with reference to the accompanying drawings wherein:

FIG. 5 shows a typical curve produced by the apparatus of FIG. 1 for a test carried out on a vehicle, and FIGS. 6A–6D represent stages in the test of the shock absorbers and suspension system of a motor vehicle.

Figure 1:
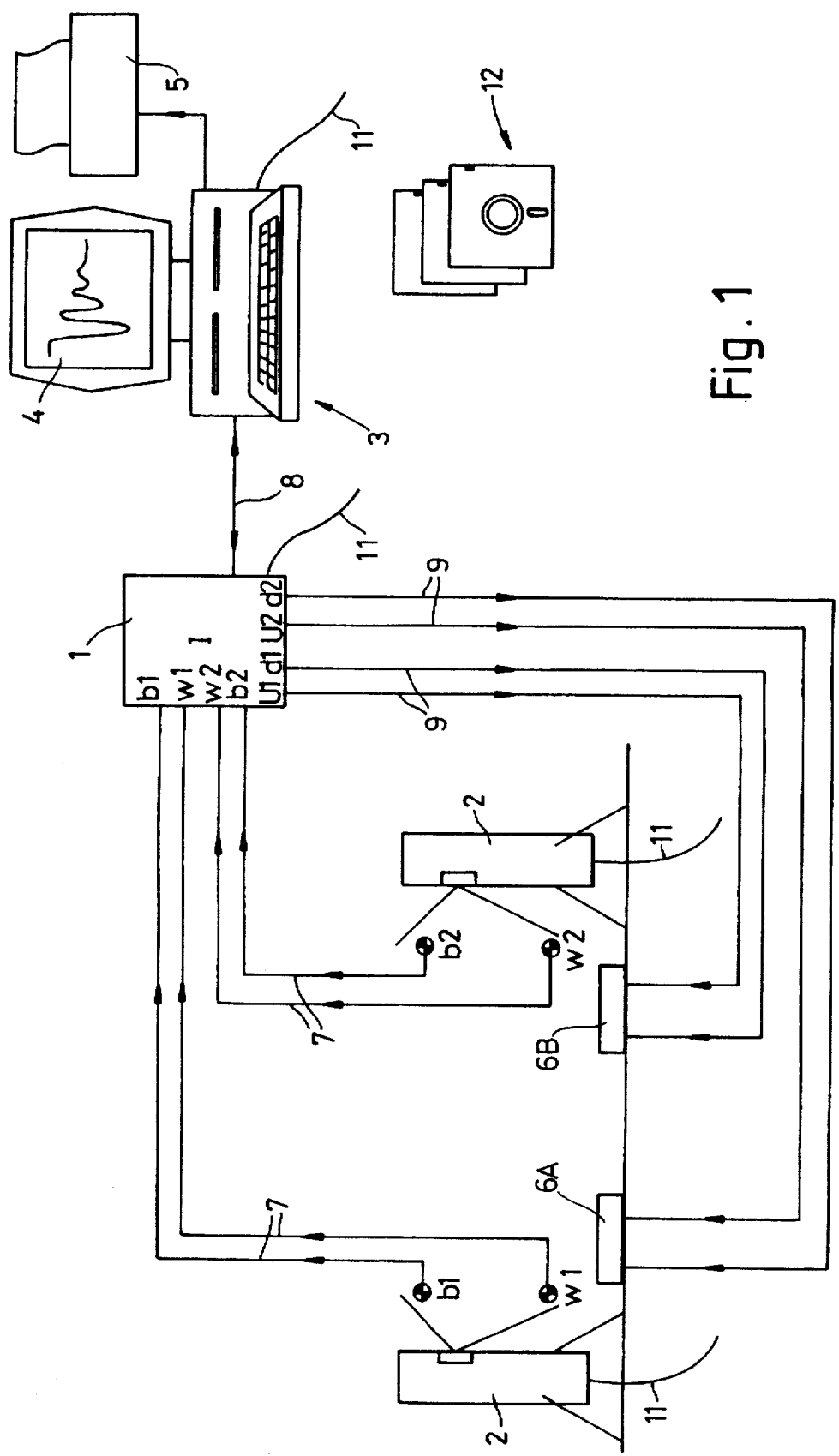
FIG. 1 shows a schematic view of apparatus for testing the shock absorbers and/or the suspension system of a motor vehicle, according to the present invention.

Referring to the drawings, especially FIG. 1, testing apparatus for testing the condition of shock absorbers and suspension systems in motor vehicles (especially motor cars and light vans) comprises an interface unit 1, indicating elements (sensors) b1, W1/b2, W2, a pair of laser beam generators 2, a computer 3 including a monitor screen 4 and a printer 5, and lifter devices 6A, 6B each adapted to raise a respective wheel 15 of a pair of opposed wheels (i.e. front or back) of the vehicle.

Each indicating element W1, W2 is adapted for fitting on a respective vehicle wheel at a set position, specifically the wheel centre, while the corresponding elements b1, b2 are fitted at a set position on the vehicle bodywork 16 for example on the wheel arch above the relevant wheel element W1, W2. The indicating elements b1, W1/b2, W2 are connected to the interface unit 1 by leads 7, whereby signal pulses are fed to the unit 1 from the indicating elements, and it is the principal object of the unit 1 to determine these signal pulses so as to produce a computed output signal representing the motion relationship between a vehicle wheel and the vehicle bodywork. The output signal is fed to the computer 3 via lead 8. The unit 1 additionally includes controls U1, U2 for raising the devices 6A, 6B and also controls d1 d2 to enable the devices 6A, 6B to be lowered, the control arrangement enabling precise positioning and movement of the devices 6A, 6B. Leads 9 connects the controls U1, U2, D1, D2 to the devices 6A, 6B.

Figure 2:
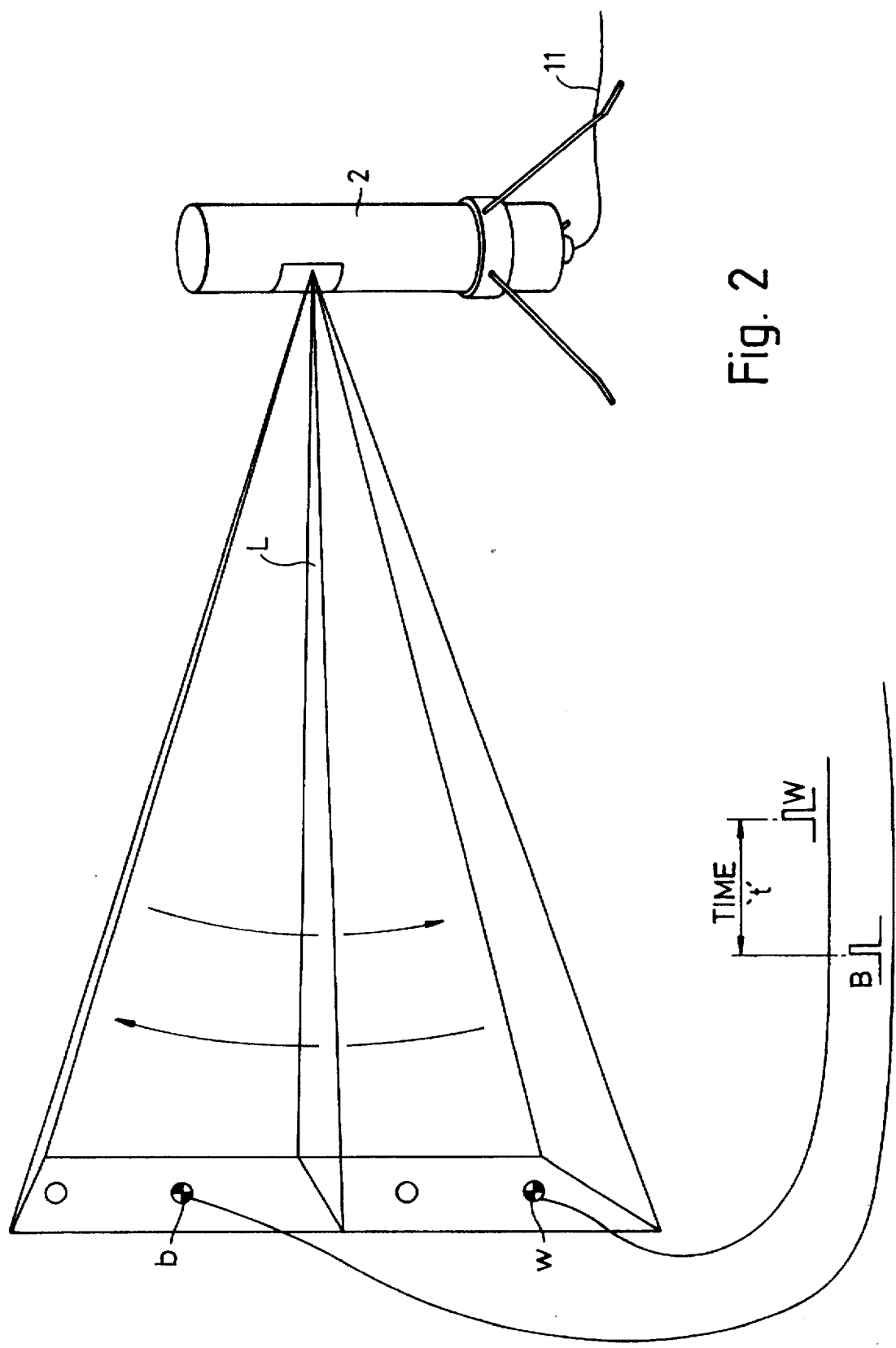
FIG. 2 shows the laser scanner of the apparatus of FIG. 1 to a larger scale.
Figure 3:
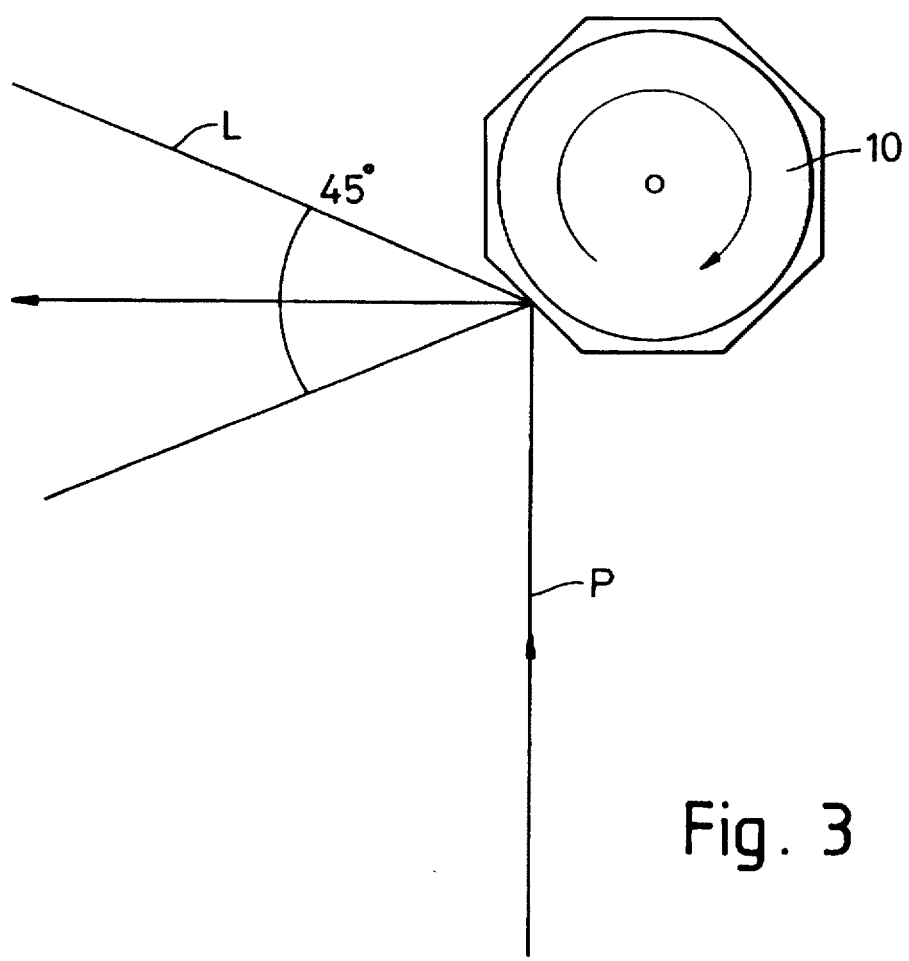
FIG. 3 shows the rotary prismatic beam generator of the scanner.

Each laser beam generator 2 provides a vertically oscillating laser beam L as is shown in FIG. 2, which L impinges on the relevant indicators W, b, during the beams' oscillations. The generator 2 is set to give an oscillating beam of precise period and to this end the generator 2 can include for example a rotary polygonal element 10 (FIG. 3) which converts a primary beam P into the desired oscillating laser beam L. By way of example the element 10 could have eight sides and a suitable rotational speed, such as for example 750 RPM (for 100 oscillations per second) or greater. The unit 1, the laser generators 2, and the computer 3 are connected to a suitable electric power source, e.g. the mains supply, by leads 11. Further, a data storage memory 12 is provided for the computer 3 which memory 12 includes pre-recorded data of selected characteristics as will be discussed later of shock absorbers and suspension systems of a range of motor vehicles in the new or as new condition.

In the testing procedure it is an object to acheive a relative motion effect between the wheels and the bodywork which approximately simulates the motion when wheels encounter potholes during normal driving as this is the situation which presents greatest demands on the shock absorbers. Thus to test shock absorbers and/or the suspension system of the vehicle, the vehicle is positioned with a pair of its opposed roadwheels e.g. the front wheels (FIG. 6A) over the lifting devices 6A, 6B. The lifting devices 6A, 6B are actuated by the controls on the unit 1, specifically control items U1/U2 to raise the opposed wheels (and the bodywork) by a specified amount h above the initial surface level G: the situation is now as in FIG. 6A with the bodywork indicating element b located at distance S above the corresponding indicating element w at the wheel. With the laser beam generators 2 providing oscillating laser beams L scanning the elements w, b of the opposed vehicles wheels and with the unit 1 operatively coupled to the computer 3, the next stage in the test is to remove the devices 6A, 6B from supportive engagement with the wheels and this is preferably achieved by means of power actuation (down and sideways as shown in FIGS. 6A and 6B) so that the wheels are permitted to fall without obstruction onto the surface G. In the dropping action, the wheels will move away relatively from the bodywork by virtue of suspension spring action so that when the wheels engage the surface G as in FIG. 6B the spacing $S_2$ between the elements b, w is greater than $S_1$. The bodywork which continues to fall after FIG. 6B will compress the suspension spring under damper action until the "bottom" position shown in FIG. 6C is reached where $S_3$ is now less than $S_1$. Oscillation of the bodywork will then follow until the steady state condition as shown in FIG. 6D is obtained when $S_4$ substantially equals $S_1$.

Figure 4:
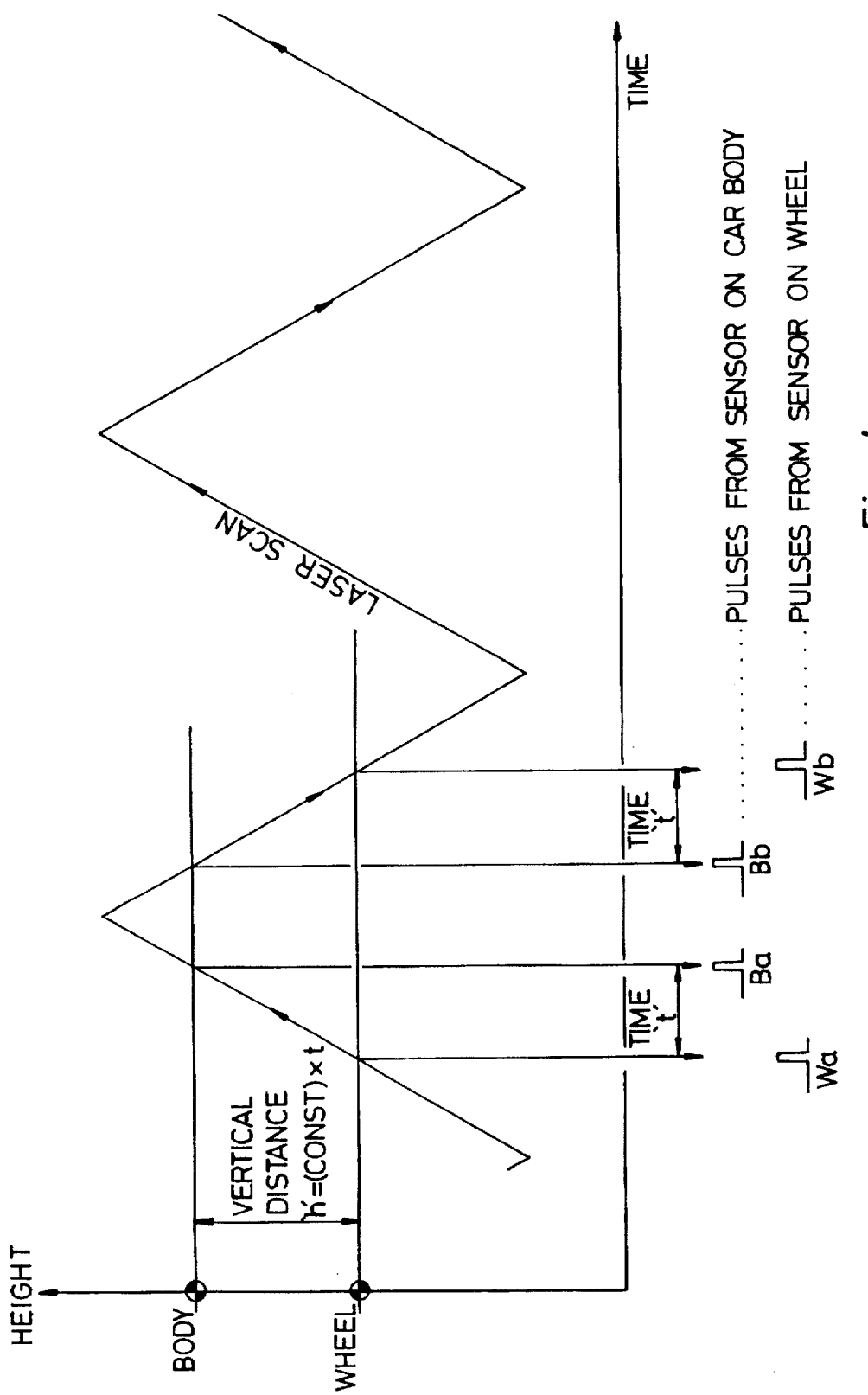
FIG. 4 is a graph of the scanning action with regard to a pair of indicating elements on the vehicle wheel and bodywork respectively.

FIG. 4 shows the operation of the scan by each oscillating beam L. Thus each time the beam L passes a wheel indicator w(1/2) a signal pulse is generated i.e. pulses $W_a$, $W_b$ and similarly signal pulses $B_a$, $B_b$ are produced by the bodywork indicators. The various signal pulses $W_a$ $B_a$ are fed to the interface unit 1 where they are determined to assess the vertical motion and speed of the bodywork relative to the associated wheel: this is a factor represented by the changing period between successive wheel/body pulses $W_a b_a$, $W_b b_b$ etc.

An output signal representing the instantaneous relative speed or motion value is fed to the computer 3 from the unit 1 via lead 8 and the computer 3 functions to present overall characteristic of bodywork motion (relative to the wheel). This characteristic can be displayed on the monitor screen 4 and/or printed on printer 5. FIG. 5 represents a typical graph of the relative motion (against time) as would be displayed on the screen 4 or printed out on printer 5. Thus, the first inversion I in FIG. 5 represents the situation in FIG. 6B where the indicator spacing ($S_2$) is greatest. Inversion II represents the FIG. 6C position, the degree of overshoot D indicating the compression created in the suspension spring by the dropping bodywork. The graph also indicates the bodywork oscillation after II until the steady state condition at III (equivalent to the FIG. 6D situation) is reached. Any weak spot of the shock absorber is shown as a blip or extended movement on the waveform, while wear of suspension parts will be indicated by waveform distortion at waveform limits i.e. at I, II etc.

The testing apparatus can function to provide an instantaneous but separate motion characteristic for each of the opposed wheels (i.e. with respect to sensors w, b and $w_2$ $b_2$). Also, a similar test will be carried on the other wheel pair i.e. the rear wheels.

A significant feature of the present invention lies in the prior carrying out of equivalent tests on vehicles (i.e. "new" vehicles) having their shock absorbers and suspension systems in correct order. The characteristics (e.g. graphs) obtained from these prior tests are stored in the computer memory 12, so that data can be readily drawn from the memory 12 to enable a comparison of the tested characteristic of a particular vehicle model with the correct characteristic for that model. This comparison should make it readily evident where a shock absorber requires replacement, or where the suspension system requires attention.

The memory 12 can be readily up-dated to include the necessary data on additional motor vehicle models.

The following benefits accrue to the customer and to the garage from the above tester according to the present invention:

- The Customer—Will not have to rely only on the word or advice of the mechanic or fitter (who apart from the mileage has no "accurate" indication of wear). As the customer is shown the car on test and the results afterwards, he has a clear indication of any need for replacement.
- The Garage—Will have much needed credibility created by the accuracy associated with lasers and the veracity of computers. He will have a much better relationship with his customer if he only replaces parts which are not only worn but are seen to be worn.

Modifications are of course possible. For example, the sensing of wheel motion could be achieved by some other sensing apparatus than the laser generator 2 and indicating elements W, b as shown in FIG. 2. Also, different means could be used for raising the wheels and bodywork, and these may be applied on the bodywork rather than on a wheel or wheels.

STATEMENT UNDER ARTICLE 19

The claims have been revised and now numbered 1 to 10. The content of previous claim 7 is now in claim 6. The main method claim 1 and apparatus claim 6 have been amended to distinguish over the references in the novelty search report especially U.S. Pat. No. 3,857,276. In particular method claim 1 now requires that the wheel of the suspension under test, and bodywork, which is raised By a lifting device is freed by moving the lifting device away from the wheel.

Apparatus claim 6 now refers to lifting means (6A), which provides this characteristic with regard to the apparatus.

Consequently, relative vertical movement between the wheel and bodywork is initially of a free nature and unhindered by the lifting device which contrasts with U.S. Pat. No. 3,857,276 where the wheel support assembly 42 falls with the wheel 14 (see column 9, lines 34 to 45). U.S. Pat. No. 3,857,276 has the disadvantage that faults in the assembly 42 would give rise to inaccurate test results

I claim:

1. A method of testing a shock absorber and suspension system while in situ in a motor vehicle, the method comprising:

raising a wheel and the bodywork or chassis of a motor vehicle under test from a ground engaging position to a raised position by means of a lifting device in supportive engagement with the wheel, moving the lifting device away from the wheel to allow the wheel to return to the ground engaging position under free fall whereby relative vertical motion occurs between the wheel and the bodywork during the fall, assessing a characteristic of relative motion between the bodywork or chassis and the wheel utilizing electronic means, the electronic means sensing relative movements of a first indicator element placed on the bodywork or chassis and a second indicator element located on the wheel by means of a sensing beam which interacts with said indicator elements, said second indicator element being fitted at the center of the wheel so that the rotation of the wheel does not affect the distance between said first and second indicator elements, recording the assessed characteristic, and comparing the assessed characteristic with a corresponding characteristic obtained for the motor vehicle type having new or as new shock absorbers and suspension system whereby the condition of the shock absorber and suspension system of the tested vehicle is established.

2. A method according to claim 1, wherein the assessment is achieved utilizing a computer apparatus enabling the assessed characteristic to be displayed on a monitor screen and/or out on a computer printout.

3. A method according to claim 2, wherein the computer apparatus includes memory storage means for the corresponding characteristics of a range of vehicles having new or as new shock absorbers and suspension systems to facilitate comparing the assessed characteristics with the corresponding characteristics.

4. A method according to claim 1, wherein the relative motion is assesed by an electronic scanning operation involving the issuance of an oscillating beam which impinges on the indicator elements.

5. An apparatus for use in testing a shock absorber and suspension system of a motor vehicle comprising:

means for causing relative vertical motion between a wheel and a bodywork or chassis of a motor vehicle, the relative motion creating means comprising lifting means engaging the wheel for raising the wheel together with the bodywork by a predetermined amount from a ground engaging position, the lifting means being movable away from the wheel for release of the wheel at the raised position to permit a free fall of the wheel and bodywork, sensing means for sensing a characteristic relative motion of the bodywork to the wheel as a consequence of the fall including means for recording the sensed characteristic, and comparison means for comparing the sensed characteristic with a corresponding characteristic obtained for the motor vehicle when it has new or as new shock absorbers and suspension system whereby the condition of the shock absorber and suspension system of the tested vehicle is established, wherein the sensing means comprises electronic means including first and second indicator elements, said electronic sensing means generating a sensing beam which interacts with said indicator elements for sensing the relative motion of said elements, said first indicator element being fitted on the vehicle body and said second indicator element being fitted on the wheel whereby the sensing means senses the relative motion between the bodywork and the wheel, said second indicator element being fitted at the center of the wheel whereby rotation of the wheel does not affect the distance between said first and second indicator elements.

6. Apparatus according to claim 5, wherein the electronic sensing means comprises an electronic scanner for scanning the indicator elements mounted on the wheel and the vehicle bodywork respectively.

7. Apparatus according to claim 6, wherein the electronic scanner is a laser scanner.

8. Apparatus according to claim 6, including computer apparatus and wherein sensed indications from the scanning indicator elements are fed to said computer apparatus for the provision of the sensed characteristic.

9. Apparatus according to claim 8, wherein said computer apparatus includes a monitor screen and/or a print out display of the sensed characteristic.

10. Apparatus according to claim 9, wherein said computer apparatus includes memory storage means for the corresponding characteristics of a suitable range of motor vehicles having new or as new shock absorbers and suspension system to facilitate comparison with the sensed characteristic.

* * * * *